United States Patent [19]

Masaki et al.

[11] Patent Number: 4,701,591
[45] Date of Patent: Oct. 20, 1987

[54] APPARATUS FOR PROCESSING MULTIPLE WORKPIECES UTILIZING A SINGLE LASER BEAM SOURCE

[75] Inventors: Takeshi Masaki, Kawasaki; Koichi Kawata, Tama; Yukuo Sakagaito, Yokohama; Katsumasa Yamaguchi, Kawasaki; Hiromichi Kinoshiro; Hiroto Toba, both of Yokohama, all of Japan

[73] Assignee: Matsushita Electric Industrial Co., Ltd, Kadoma, Japan

[21] Appl. No.: 668,855

[22] Filed: Nov. 6, 1984

[30] Foreign Application Priority Data

Nov. 7, 1983 [JP] Japan ............................ 58-208520
Jun. 8, 1984 [JP] Japan ............................ 59-118465
Jun. 12, 1984 [JP] Japan ............................ 59-121176

[51] Int. Cl.$^4$ ............................................ B23K 26/00
[52] U.S. Cl. ....................... 219/121 LT; 219/121 LA; 219/121 LS; 219/121 LV
[58] Field of Search ..... 219/121 L, 121 LM, 121 LS, 219/121 LT, 121 LV, 121 LU, 121 LA; 352/285, 486, 266, 273, 274

[56] References Cited

U.S. PATENT DOCUMENTS

| | | | |
|---|---|---|---|
| 4,118,619 | 10/1978 | McArthur et al. | 219/121 LT |
| 4,229,232 | 10/1980 | Kirkpatrick | 219/121 LA |
| 4,258,246 | 3/1981 | Karube et al. | 219/121 FS |
| 4,404,452 | 9/1983 | Cashwell | 219/121 LT |
| 4,499,362 | 2/1985 | Martin | 219/121 LA |
| 4,540,867 | 9/1985 | Ackerman | 219/121 LT |

OTHER PUBLICATIONS

IBM Technical Disclosure Bulletin, vol. 21, No. 11, 4/1979.

*Primary Examiner*—M. H. Paschall
*Attorney, Agent, or Firm*—Cushman, Darby & Cushman

[57] ABSTRACT

Processing of plural works can be made simultaneously by using divided laser beams which is issued from one large $CO_2$ laser beam source, the dividing being made by one or more rotary chopper mirror(s) comprising reflecting parts and light passing parts, and its ration and pulsive start and stop of laser oscillation are controlled in interrelated manner and by controlling the duty time of the laser oscillation in PWM manner. The distribution of powers of the laser beams divided by the rotary chopper mirrors is desirably selectable, thereby enabling simultaneous processing of plural works under the different processing conditions.

5 Claims, 27 Drawing Figures

APPARATUS FOR PROCESSING MULTIPLE WORKPIECES UTILIZING A SINGLE LASER BEAM SOURCE

BACKGROUND OF THE INVENTION

1. Field of the Invention

The present invention relates generally to laser processing apparatus, and particularly concerns laser processing apparatus capable of work at plural work stations.

2. Description of the Prior Art

Laser apparatus for processing (for instance, cutting, drilling, welding, engraving, or heat processing of a workpiece) comprises a laser oscillator and an optical system for directing and focusing a laser beam on a work spot.

When constructing laser processing apparatus for actual manufacturing systems, it is possible to construct the apparatus to enable processing at plural work stations. To accomplish this laser processing apparatus is known which comprises one laser oscillator of a high power the, a beam-splitter for dividing output laser beam output of the laser oscillator into plural laser beams, plural wave-guides for directing the divided laser beam to the plural work stations, and focusing devices to focus the guided laser beam onto workpiece. One example of conventional laser processing apparatus having beam-splitter now will be described with reference to FIG. 1.

A laser oscillator 1 oscillates and issues a laser beam 6, which is divided into two laser beams 7 and 8 by a beam-splitter. The beam 7 irradiates a workpiece 4 at a first work station, and the other laser beam 8 irradiates, after reflection by a mirror 3, another workpiece 5 at another work station. However, a laser processing apparatus utilizing the conventional beam-splitter 2 has the following problem. Firstly, the output powers of the divided laser beams 7 and 8 are fixed to a certain levels, for instance, each about 50 W when the output laser beam 6 has a power of 100 W. That is, the ratio between the powers of two divided laser beams can not be changed as desired, and therefore when switching of the output power is desired, it is not easy to make such power adjustment. Furthermore, for the laser oscillator 1, a laser having consderably larger output, greater than the total of the powers used in plural work stations, has been neccessary. Furthermore, the beam-splitter 2 introduces light energy loss, and a half-mirror in the beam-splitter 2 receives considerable damage when the output power of the laser beam 6 from the laser oscillator 1 is high.

SUMMARY OF THE INVENTION

The purpose of the present invention is to provide a laser processing apparatus wherein the above-mentioned shortcomings are solved, and plural laser beams are developed at desired power ratios with high utility efficiency of a common laser oscillator.

A laser processing apparatus according to the invention comprises:

a laser oscillator to produce a light beam, at least one rotary chopper mirror disposed in a path of the light beam, and means for synchronizing the oscillations and interruptions of the oscillations of the laser oscillator and the rotation of the rotary chopper mirror.

The above-mentioned laser processing apparatus can feed laser beams of different powers to different work stations by selectively adjusting pulse duty ratios of oscillation of the laser oscillator and distributing laser oscillation powers of different duty widths to respective work stations by means of the rotary chopper.

Furthermore, a laser processing apparatus in accordance with the present invention comprises:

a laser oscillator to produce a light beam, at least one rotary chopper mirror disposed on a path of the light beam, a rotation sensor for sensing angular positions of mirror parts and aperture parts of the rotary chopper mirror to produce an oscillation controlling signal, and controlling means for controlling phase and frequency of the oscillations and interruptions of the oscillations of the laser oscillator.

This laser processing apparatus can distribute laser beams of different powers to respective work stations by utilizing the oscillation controlling signal, thereby controlling oscillation and stopping of the laser oscillator so as to feed desired laser beam powers to respective work stations at a desired distribution ratio.

In the above-mentioned apparatus plural work stations can receive different laser beam powers suitable for respective machining or processing.

Furthermore, the laser processing apparatus in accordance with the present invention is improved so that its rotary chopper mirror, as beam dividing means, is not damaged by heat loss caused by high power laser beam.

DESCRIPTION OF THE PREFERRED EMBODIMENTS

Further objects and features of the present invention will become clear from the following detailed description of the preferred embodiments.

Figure 1:
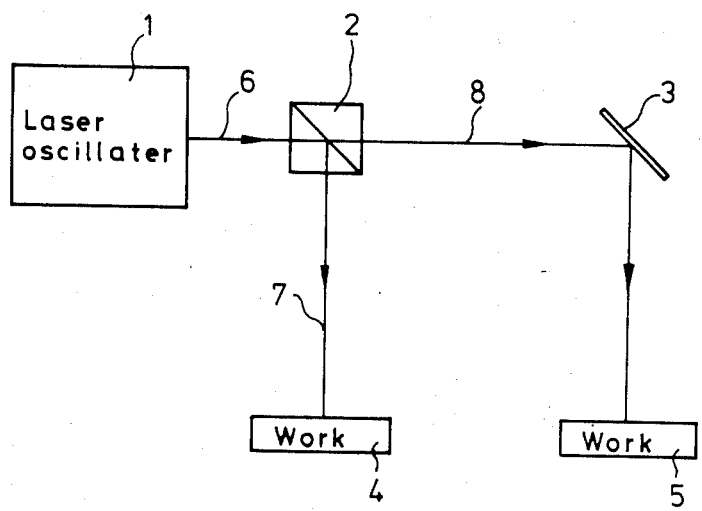
FIG. 1 is a block diagram showing a conventional example of a laser processing apparatus.
Figure 2:
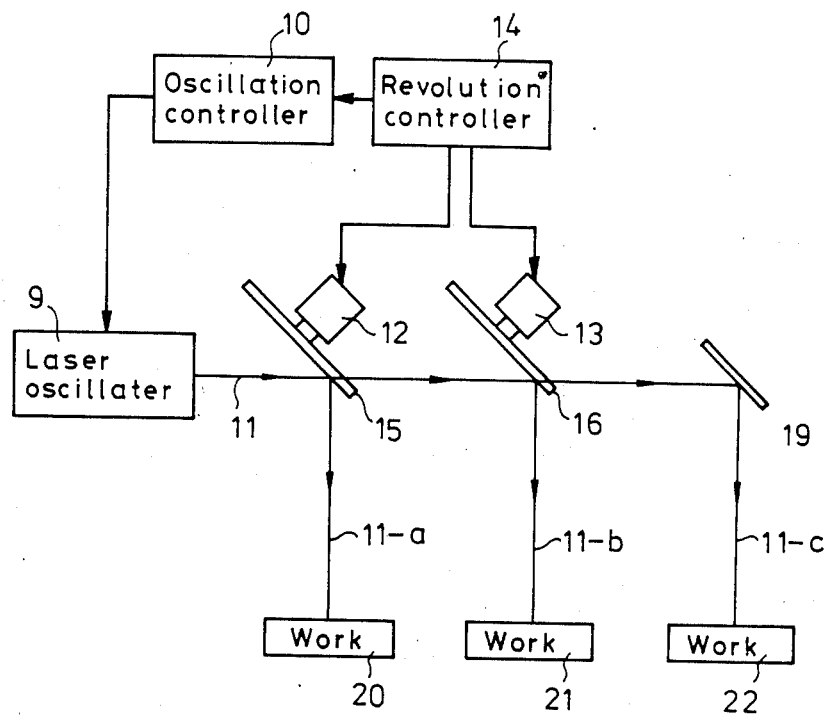
FIG. 2(a) is a block diagram of a laser processing apparatus embodying the present invention.
FIG. 2(b) is a front view of a rotary chopper mirror 15 or 16 which may be used in the embodiment of FIG. 2(a).
Figure 2:
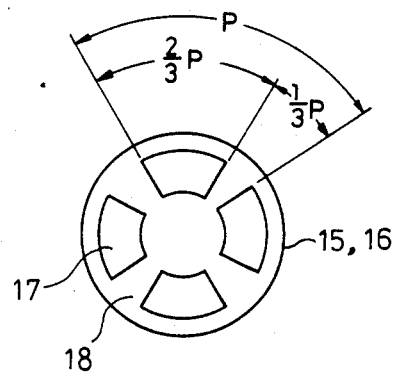

FIG. 2(a) shows a first embodiment of laser processing system, and FIG. 2(b) shows a rotary chopper mirror 15 or 16, used in processing three workpieces by laser beams from one common laser oscillator 9. As shown in FIG. 2(a), the laser oscillator 9 oscillates to issue a laser beam 11, under the controll of an oscillation controller 10. Motors 12 and 13 for rotating the rotary chopper mirrors 15 and 16 are controlled by a revolution controller 14. The rotary chopper mirrors 15 and 16 each have radially disposed apertures 17 and mirror parts 18, the ratio of areas of the apertures and the mirror parts being selected as 2:1 in this example. The mirrow parts are made, for example, of an aluminum sheet plated by nickel in a non-electrolytic plating process which is followed by a mirror-face polishing process and subsequent vapor desposition of gold, to achieve 98% reflectivity. The rotary chopper mirrors 15 and 16 are disposed sequentially in the path of the laser beam 11 of the laser oscillator 9. Thereafter, an ordinary mirror 19 is disposed to change the path of the laser beam. Workpieces 20, 21 and 22 to be processed are disposed to receive, respectively, laser beams which are reflected by the first rotary chopper mirror 15, the second rotary chopper mirror 16 and the ordinary mirror 19.

Figure 3:
FIG. 3 is a chart showing the waveforms of electric signals and light beams produced by various parts of the embodiment of FIG. 2(a).
Figure 3:
Figure 3:
Figure 3:
Figure 3:
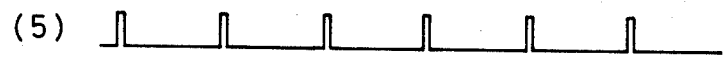
Figure 3:
Figure 3:

The operation of this embodiment now will be detailed with reference to timing chart of FIG. 3 which shows timings of the laser oscillation control. Waveform (1) of FIG. 3 shows a signal for synchronizing the laser oscillation and for controlling the rotary chopper mirror rotation. Waveform (2) of FIG. 3 shows an oscillation controlling signal, with which the oscillation and interruption of oscillation of the laser are controlled, for example, in the case of simultaneously cutting a metal plate, cutting a metal sheet and welding a metal workpiece through the sharing a common large power laser, such as a $CO_2$ laser, at different power consumption rates. The oscillation controlling signal is produced by modulating the pulse width of the waveform (1) to correspond to the needed powers for the plural usages of the divided laser beams. By changing the duty ratio of the oscillation controlling signal, the ratio of power distributed to the plural processing of workpieces 20, 21 and 22, by means of the divided laser beams 11-a, 11-b and 11-c, can be changed, and different operations involving different output powers of laser beams can be carried out simultaneously.

Waveforms (3) and (4) of FIG. 3 show rotation phases of the rotary chopper mirrors 15 and 16, and the levels H and L respectively corresponding to the aperture parts 17 and the mirror parts 18 of the rotary chopper mirrors 15 and 16. The rotary chopper mirrors 15 and 16 are controlled by the rotation controller 14. The timings of the oscillating time periods and non-oscillating time periods of the laser oscillator 9 correspond to high level time periods and low level time periods of the waveform (2), respectively. The part of the laser beam power reflected by the mirror parts 18 of the rotary chopper mirror 15, i.e., the divided beam 11-a, is shown by the waveform (5) of FIG. 3, and is fed to the workpeice 20. The part which which has passed through the aperture parts of mirrors 15 and 16 and which is reflected by the mirror parts 18 of the rotary chopper 16, i.e., the divided beam 11-b, is fed to the workpiece 21. Finally, the part which has passed through the aperture parts of mirrors 15 and 16 and which is reflected by the ordinary mirror 19, i.e., the divided beam 11-c, is fed to the wordpiece 22. Thus single the output beam of the common laser oscillator is divided into plural parts having a desired ratio defined by the pulse width modulation, or in other words, by the selection of a desired duty ratio of the oscillation controlling signal.

In the same manner as the above-mentioned embodiment, by only varying number of sequentially disposed rotary chopper mirrors, the number of work stations can be arbitrarily selected. The kind of processing can be cutting, welding, engraving or any other possible type of operations utilizing laser beam energy.

The above-mentioned embodiment enables simultaneous, or parallel processings at different work positions, using only a single laser oscillator. As a result of such parallel utilization of the divided laser beams from a single common laser oscillator of a high output power, the expensive high power laser oscillator can be utilized at a high utility factor and with a desired ratio of power consumptions for different work stations.

Figure 4A:
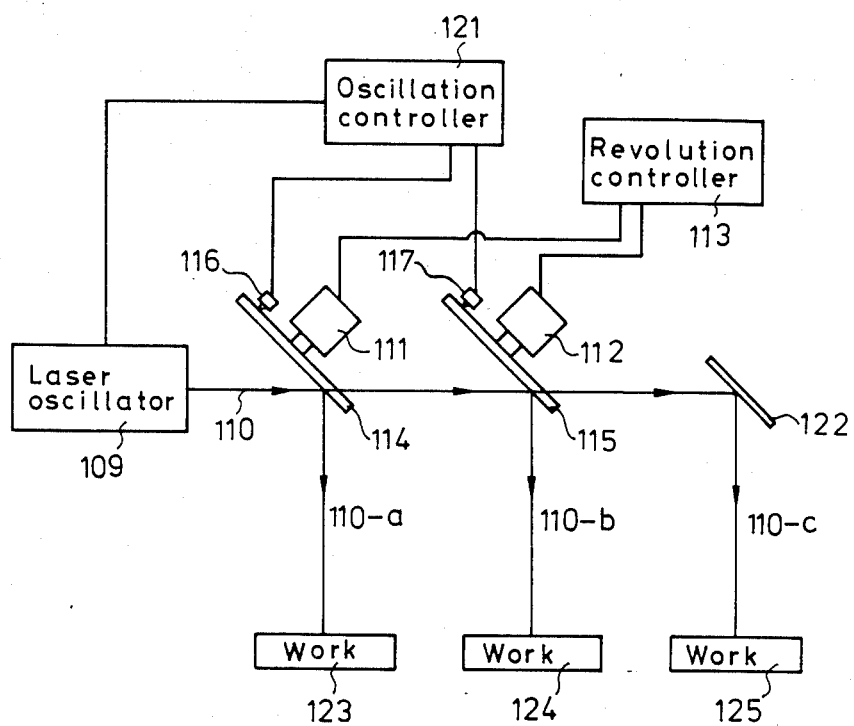
FIG. 4(a) is a block diagram showing another laser processing apparatus embodying the present invention.
Figure 4B:
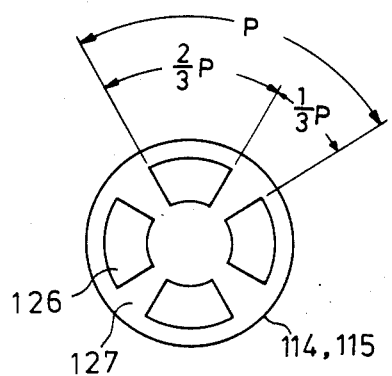
FIG. 4(b) is a front view of a rotary chopper mirror which may be used in the embodiment of FIG. 4.

FIG. 4(a) shows a block diagram of a second embodiment of the present invention. In this embodiment three workpieces are simultaneously processed by one common laser oscillator. In FIG. 4, laser oscillator 109 radiates a pulse laser beam 110. Revolution driving motors 111 and 112 for rotating the rotary chopper mirrors 114 and 115, respectively, are controlled by a revolution controller 113. As shown in FIG. 4(b), each of the chopper mirrors 114 and 115 has radially disposed aperture parts 126 and mirror parts 127, and the ration of areas of the aperture parts and the mirror parts is selected to be 2:1 in this example. The mirror parts are made, for example, of an aluminum sheet plated by nickel in a non-electrolytic plating process which is followed by a mirror-face polishing process and subsequent vapor deposition of gold to achieve 98% reflectivity. The shape of the aperture parts and the mirror parts of the rotary chopper mirror need not be made with high precision because the revolution of the rotary chopper mirror is sensed by the photosensor. The rotary chopper mirror is designaed in consideration of the diameter and on-time of the laser beam and the mirror's revolution rate.

Figure 4C:
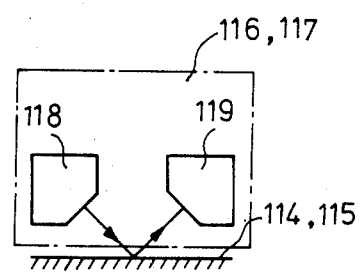
FIG. 4(c) is a side view showing detailed configuration of a sensor 116 and 117 of FIG. 4(a).

As shown in FIG. 4(c), two photosensors 116 and 117, composed of a light emitting device 118 and a light detecting device 119, are disposed adjacent the surfaces of the rotary chopper mirrors 114 and 115, respectively. An oscillation controller 121 produces pulse signals based on the signals detected by the photosensors 116 and 117, and these pulse signals control the laser oscillator. An ordinary mirror 122 is disposed to change the path of the laser beam.

Three workpieces 123, 124 and 125 set up at predetermined positions, respectively related to beams 110-a to 110-c.

The operation of this embodiment is now will be detailed with reference to timings chart of FIG. 5 which shows timing of the laser oscillation control. The two rotary chopper mirror 114 and 115, controlled by the revolution controller 113, rotate at the same speed.

When the number of revolutions of the rotary chopper mirror is 300–3300 rpm, the pulse frequency of the laser beam becomes 20–220 Hz, because the rotary chopper mirror has four apertures on it.

Figure 5:
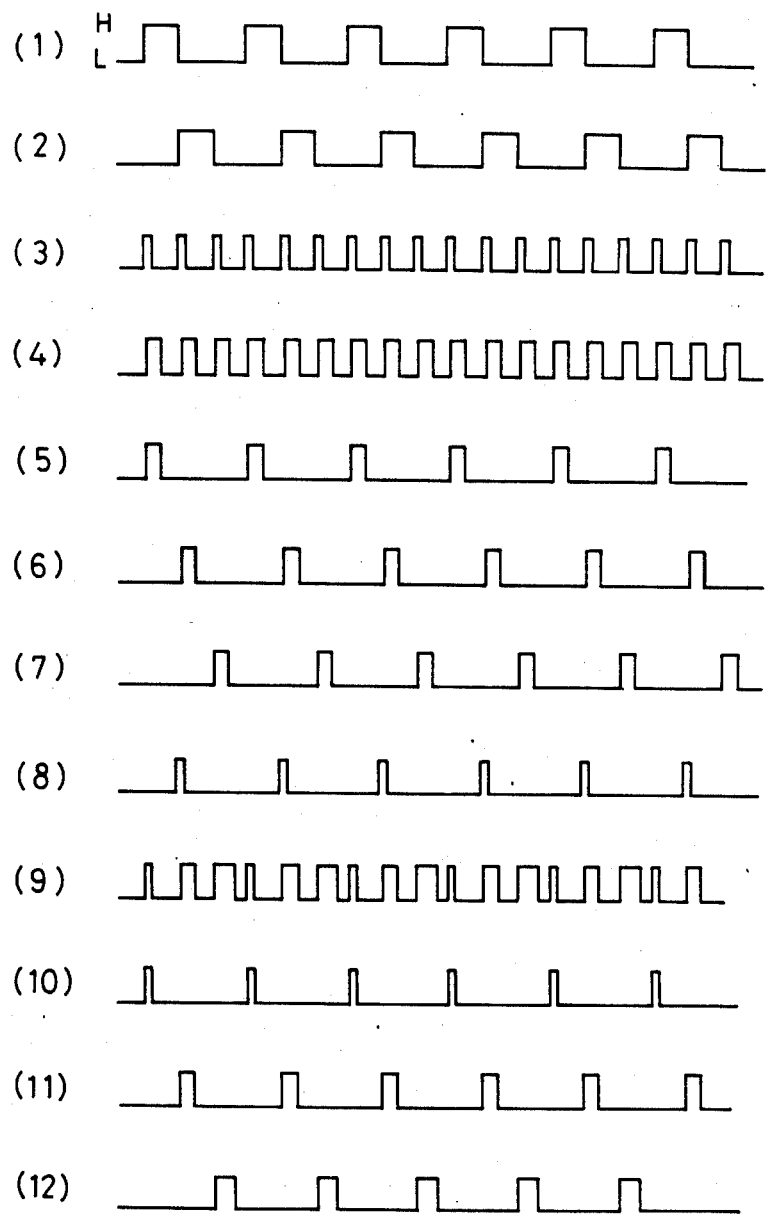
FIG. 5 is a waveform chart showing waveforms of electric signal and light beams of various parts of the embodiment of FIG. 4(a).

The output signals of the photosensors 116 and 117 are shown in FIG. 5 (1) and (2), a phase shift between the waveforms of FIG. 5. 5 (1) and (2) indicating that the two rotary chopper mirrors are rotating at a phase difference of 120 degrees. "H" in the waveform (1) of FIG. 5 corresponds to the detection of signals from the mirror parts and "L" corresponds to signals occuring when apertures are encountered. Waveform (3) of FIG. 5 shows the pulse signal produced by the oscillation controller 121. This pulse signal controls the laser oscillator 109 to process the three workpieces 123, 124 and 125 under uniform processing conditions.

Waveform (4) of FIG. 5 shows the oscillated laser beam 110 produced under the control of the pulse signal (3) of FIG. 5. The laser beam 110-a which is reflected by the mirror parts of the rotary chopper mirror 114 is shown in the waveform (5) of FIG. 5. This beam is and applied to the workpiece 123.

The remainder of the laser beam which passes the aperture parts of the rotary chopper mirror 114 is led to the rotary chopper mirror 115, and the laser beam 110-b which is reflected by the mirror parts or the rotary chopper mirror 115 is directed to the workpiece 124. Remainder of the laser beam 110-c which passes the aperture parts of the rotary chopper mirror 115 is reflected by the ordinary mirror 122 and is applied to the workpiece 125.

As above-mentioned, this embodiment enables simultaneous processing at three places by one common laser oscillator.

In order to process only one workpiece or to process three workpieces under the different processing conditions, the laser oscillator 109 is controlled by the oscillation controller 121 as follows. The waveform (8) of FIG. 5 shows the control pulses produced by the oscillation controller 121, and these pulse control the laser oscillator 109 for developing the laser beam which is shown in the waveform (6) of FIG. 5. The timing of the pulse train in the waveform (6) of FIG. 5 coincides with the timing of the aperture parts of the rotary chopper mirror 114 and coincides with the timing of the mirror parts of the rotary chopper mirror 115. Therefore, the laser beam 110 passing the aperture parts of the rotary chopper mirror 114 is reflected by the mirror parts of the rotary chopper mirror 115, and is applied to the workpiece 124 only.

When different operations are to be performed on three workpieces, the control pulses of the oscillation controller 121 become pulse signals as shown in FIG. 5 (9). As a result, divided laser beams 110-a, 110-b and 110-c are represented as the pulse signals shown in FIG. 5(10), FIG. 5(11) and FIG. 5(12), respectively. The different kinds of operation may comprise, for example, cutting a thick plate as a workpiece 123, cutting a thin plate as a workpiece 124 and welding the workpiece 125. These separate operations are possible because of different duty ratios which represent the ratio of on-time and off-time of the divided laser beams. The control of output intensity of the laser beam 110 enables three different kinds of operations simultaneously using one common laser oscillator. It is possible to change the kind of operation by changing the pulse frequency. This is accomplished by changing the speed of rotation of the rotary chopper mirror.

The laser processing apparatus of this embodiment permit plural operations simultaneously using one common laser pulse oscilator synchronized with the rotation of the rotary chopper mirror. Thus, a manufacturing line including the laser processing apparatus of the present invention is improved remarkably because the laser oscillator can be utilized at very high efficiency.

Figure 6:
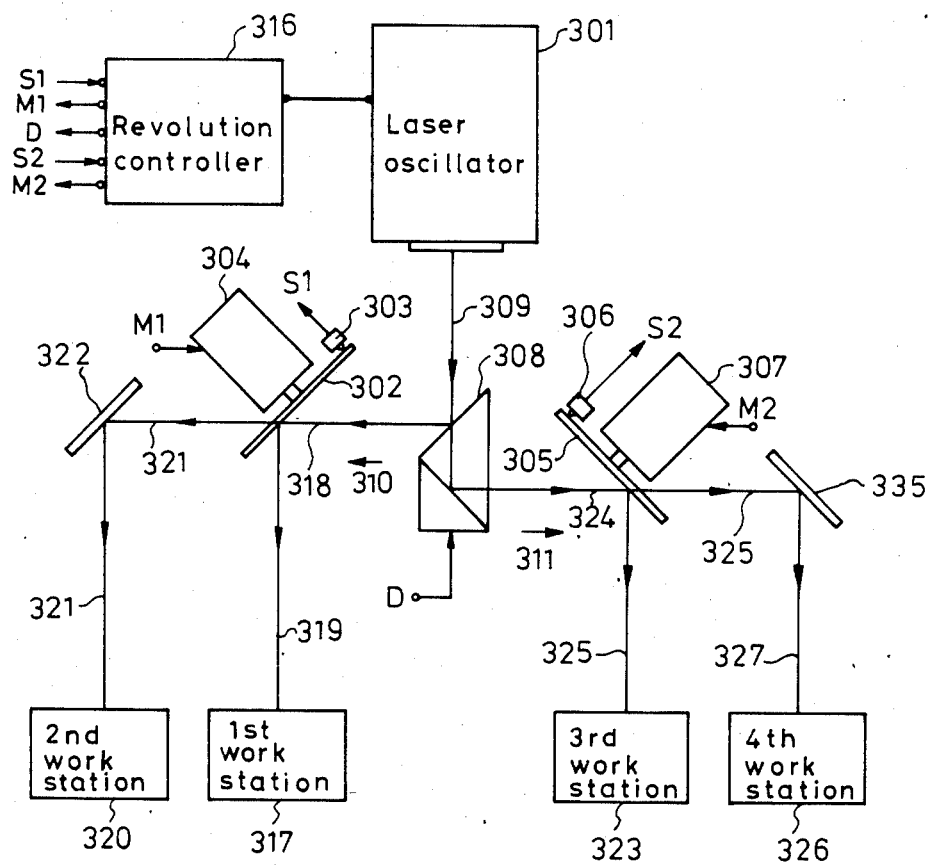
FIG. 6 is a block diagram of another laser processing apparatus embodying the present invention.

FIG. 6 shows a block diagram of a third emobodiment of the present invention. In this embodiment, four workpieces are simultaneously processed using one common laser oscillator.

Figure 8A:
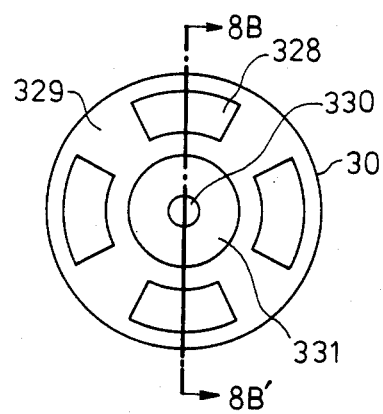
FIG. 8(a) is a front view of a modified rotary mirror chopper which may be used in any of the foregoing embodiments.
Figure 8B:
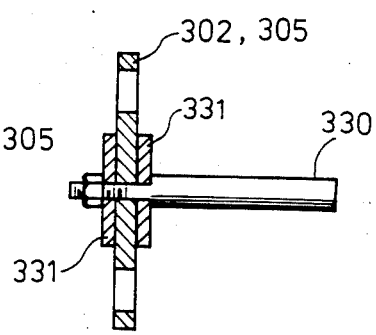
FIG. 8(b) is a sectional view of the rotary chopper mirror of FIG. 8(a).

In FIG. 6, a laser oscillator 301 radiates a laser beam 309. First and second motors 304 and 307 for rotating the rotary chopper mirrors 302 and 305, respectively, are speed controlled by a revolution controller 316. Each of the rotary chopper mirrors 302 and 305 has, as is shown in FIG. 8(a) and FIG. 8(b), radially disposed aperture parts 328 and mirror parts 329. Two flanges 331, 331 clamp the chopper mirror 302 or 305 and are fixed to a shaft 330. A first sensor 303 and a second sensor 306 are disposed adjacent the surface of the first and the second rotary chopper mirrors 302 and 305, respectively.

Figure 7:
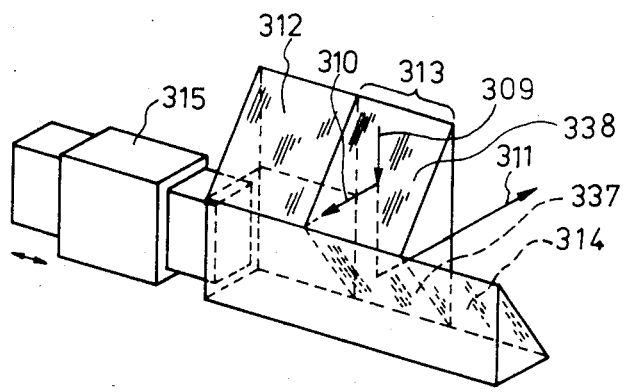
FIG. 7 is a perspective view showing an example of beam-splitter 308 of FIG. 6.
Figure 7:
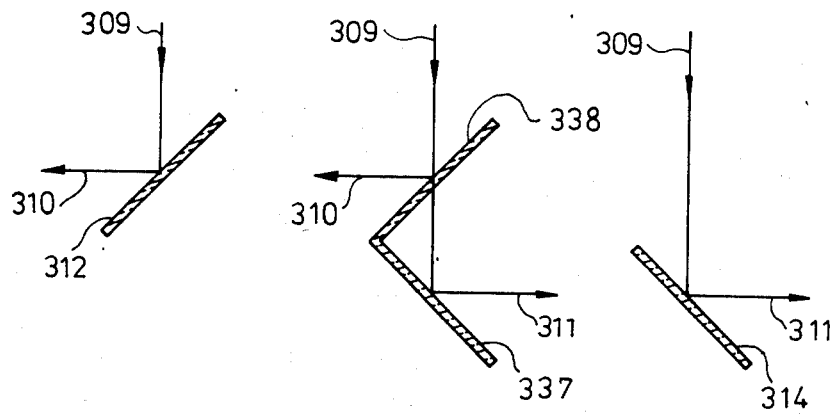

A laser beam divider 308 is controlled by the revolution controller 316, and the laser beam 309 radiated from the laser oscillator 301 is reflected selectively either in two directions at one time 310, 311 or in a first direction 310 at one time and in a second direction 311 at another time. The laser beam distributor 308, as is shown in detail FIG. 7, comprises a first mirror 312, a known beam-splitter 309 and a second mirror 314. The first mirror 312 is for reflecting the laser beam 309 pin the first direction 310, while the beam-splitter 313 is for splitting the laser beam 309 in both the first direction 310 and the second direction 311 by using a normal mirror 337 and a half mirror 338. The second mirror 314 is for reflecting the laser beam 309 in the second direction 311. The laser beam distributor 308 additionally includes positioning means 315 for laterally moving the distributor.

Side and cross-sectional views of the rotary chopper mirrors 302 and 305 are shown in FIG. 8(a) and FIG. 8(b), respectively. The rotary chopper mirror is provided with aperture parts 328 for passing the laser beam and mirror parts 329 for reflecting the laser beam. This rotary chopper mirror is clamped by two flanges 331, 331. A shaft 330 is inserted in the center holes of these flanges and the rotary chopper mirror 329.

The revolution controller 316, which responds to signals from the first and second sensors 303 and 306, controls the first driving motor 304 and the second driving motor 307. Thus, the first rotary chopper mirror 302 and the second rotary chopper mirror 305 are synchronized with each other. The revolution controller 316 also controls both the oscillation of the laser oscillator 310 and the positioning means 315 of the laser beam distributor 308 whereby one of the three positions of the first mirror 312, the beam-splitter 313 and the second mirror is selected. A laser beam 318, achieved by directing the laser beam 309 by laser beam distributor 308 in a first direction 310, is reflected by mirror parts of a first rotary chopper mirror 302. This reflected laser beam 319 is applied to a first work station 317. A laser beam 321, the portion of beam 318 which passes through aperture parts of the first rotary chopper mirror 302, is reflected by a third mirror 322 and is applied to a second work station 320. A laser beam 324, achieved by directing the laser beam 309 in a second direction 311 by the laser beam distributor 308, is reflected by the mirror parts of a second rotary chopper mirror 305. This reflected laser beam 325 is applied to a third work station 323. A laser beam 325, the portion of beam 324 which has passed through the aperture parts of the second rotary chopper mirror 305, is reflected by a fourth mirror 335, and the reflected laser beam 327 is applied to a fourth work station 326.

The operation and effect of a laser processing apparatus as just described is as follows.

When the laser beam distributor 308 is set by the positioning means 315 at the position that the beam-splitter 312 receives the laser beam 309, the first, the second, the third and the fourth work stations 317, 320, 323 and 326 receive substantially the same laser beam power, because the laser beam 309, which is oscillated by the laser oscillator 301, is divided into nearly equal laser beams 318 and 324, and these are further divided into two laser beams by the respective rotary chopper mirrors 302 and 305 through the dividing process which has been describved above relative to the second embodiment of the invention. The first, second, third and fourth work stations are applied with laser beams of the first and second driving motors 304 and 307, which in turn is controlled by the revolution controller 316. The intensity of each other the divided laser beams 318 and 324 is half of that the laser beam 309, whereby the operational capability is half of the original laser beam 309.

When the laser beam distributor 308 is switched by the positioning means 315 to the position that the mirror 312 receives the laser beam 309, two works are simultaneously processed at the first and the second work stations 317 and 320. When the laser beam distributor 308 is switched to the position that the second mirror 314 receives the laser beam 309, two works are simultaneously processed at the third and the fourth work stations 323 and 326. In the latter two cases, since the laser beam 309 is not divided by the beam splitter 313, the workpieces on the work stations are exposed to almost the full power of the laser beam 309.

The purpose of the rotary chopper mirror is to distribute the laser beam in two directions without decreasing its energy. When the power of the laser beam 319, which is applied to the work station 317, is to be increased, the duty ratio of the oscillated laser pulse must be increased. But if the duty ratio exceeds about 40–50%, the rotary chopper mirror 302 can not guide the laser beam 319 perfectly because the laser beam has a certain diameter. Accordingly, it is necessary that the rotary chopper mirror 302 be stopped and used as stationary mirror processing only one workpiece at a work station. Though the number of usable work station is only one, in this case, the time periods for setting up workpieces on to the work stations can be shortened, and the efficiency of operation of the laser processing apparatus can be increased by using the remaining work station(s) as preparation work station(s).

In the third embodiment of the invention just described, the laser processing apparatus very high efficiency of operation, and the total processing capability of the laser oscillator can be utilized very effectively.

Figure 9:
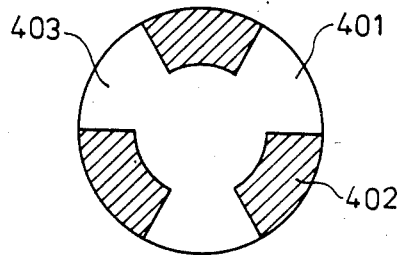
FIG. 9 is a front view of another modified rotary chopper mirror which may be used in any of the foregoing embodiments.

FIG. 9 is a plan view of a modified rotary chopper mirror. This embodiment is suitable for the beam of a $CO_2$ laser. A substrate 401 is a material transparent to $CO_2$ laser light, for example, ZnSe. The surfaces of the substrate are well polished in order to avoid damage when transmitting the laser beam. A vapor deposition of gold is applied to three reflection parts 402, and the remainder part 403 is transparent.

Figure 10:
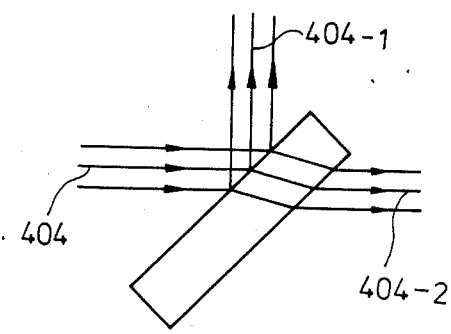
FIG. 10 is a diagrammatic side view showing the light paths relative to the rotary chopper mirror of FIG. 9.

FIG. 10 shows the path of the laser beam through the mirror shown in FIG. 9. When a laser beam 404 is applied to the gold-vapor deposited parts, the beam 404 is reflected as beam 404-1. When the laser beam 404 is applied to the transparent part 403, the laser beam 404 passes through the substrate, and exits in a path designated as 404-2 at the right of FIG. 10.

The rotary chopper mirror just described has no aperture on the substrate 401. Therefore the surface of the substrate is smooth. The rotary chopper mirror consequently has superior dynamic balance and is capable of very precise rotation. Furthermore, since there is no internal distortion due to mechanical machining, the smoothness of the surface is maintained for a long time.

When the laser beam passes through the transparent part of the substrate, the path of the laser beam refracts as shown in FIG. 10. Therefore, the diameter of the substrate can be smaller as compared with a substrate having apertures. Since the surface of the rotary chopper mirror of the FIG. 10 embodiment is smooth, air stream noise is minimized. The rotary chopper mirror drags little air during rotation, and it rarely is damaged on the surface by dust in the air. Any material which passes a laser beam can be used as a substrate of the rotary chopper mirror of the type shown in FIG. 10.

Figure 11:
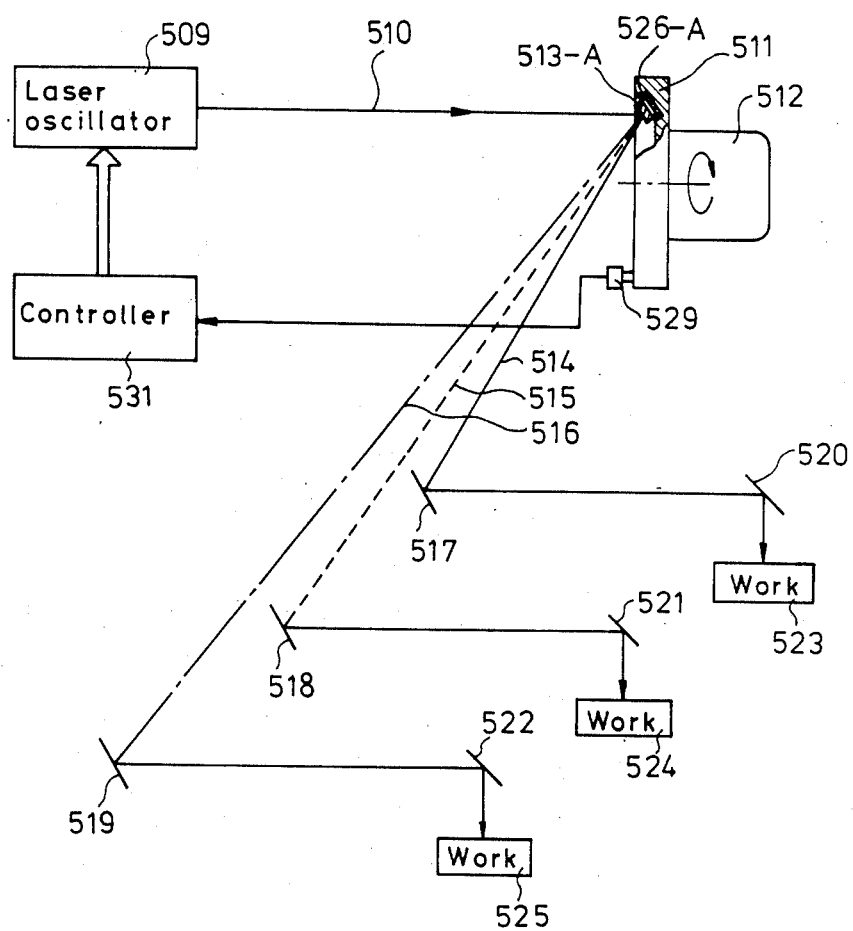
FIG. 11 is a block diagram of still another laser processing apparatus comprising a rotary chopper mirror which has curved surface mirrors.

FIG. 11 illustrates still other embodiment of the invention, and in this embodiment, three workpieces are processed using one laser oscillator.

In FIG. 11, a laser oscillator 509 produces a pulse laser beam 510. The revolutions of a rotary mirror 511 are controlled by a rotary driving means 512. Three reflecting mirrors 513-A, 513-B and 513-C having convave mirror faces are disposed on the rotary mirror 511, for reflecting the laser beam 510. (513-B, 513-C are not shown). Two reflection mirrors 517 and 520 reflect a laser beam 514 to a workpiece 523. Other two reflection mirrors 518 and 521 reflect a laser beam 515 to a workpiece 524.

Finally, two reflection mirrors 519 and 522 reflect a laser beam 516 to a workpiece 525.

Figures 12A, 12B:
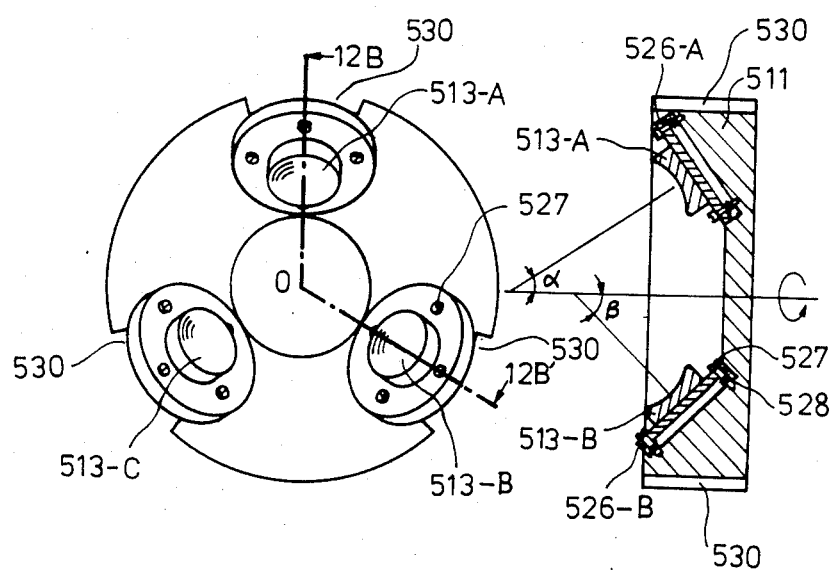
FIGS. 12(a) and 12(b) are front and cross-sectional views, respectively, of a rotary mirror chopper having a curved surface mirror.

A plan view and a cross-sectional view of the rotary disc 511 are shown in FIG. 12(a) and FIG. 12(b), respectively. The three reflection mirrors 513-A, 513-B and 513-C are disposed on the rotary disc 511 at angles of $\alpha$, $\beta$ and $\gamma$ (not shown), respectively, with respect to the axis of the rotary disc. Each angle is adjusted by adjusting bars 526-A, 526-B and 526-C, which are tilted by an adjusting screw 527 and adjusting spring 528. A sensor 529, shown in FIG. 11, detects three indentations 530, 530, 530 disposed on the outer periphery of the rotary disc 511, each corresponding with a reflecting mirror 513-A, 513-B and 513-C. An oscillation controller 531 controls a laser oscillator 509 so as to generate pulse signals corresponding to signals developed by the sensor 529.

Figure 13:
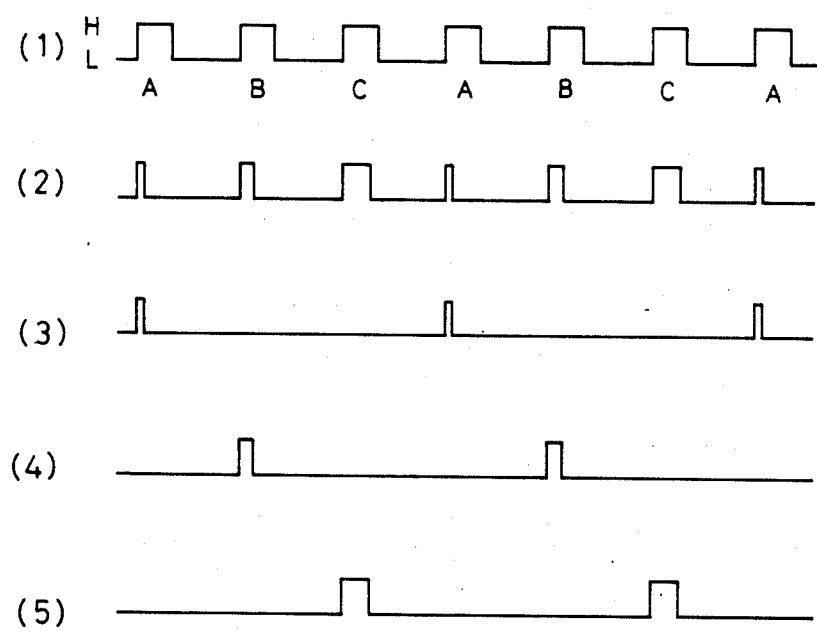
FIG. 13 is a chart showing the waveforms of electric signals and light beams various parts of the embodiments of FIG. 11 and FIGS 12(a) and (b).

Operation of this embodiment of the invention is illustrated in FIG. 11 and a timing chart, FIG. 13.

The disc 511 is rotated by the rotary driving means 512 which is controlled in its number of revolutions. The waveform (1) of FIG. 13 shows an output pulse train from the sensor 529. In this output, pulses, A, B and C correspond to signals developed at the reflecting mirrors 513-A, 513-B and 513-C. More particularly, the laser beam is divided into three parts, and each divided laser beam is applied respectively to the workpiece 523 comprising a thick plate being cut, the workpiece 524 comprising a thin plate being cut and the workpiece 525 being welded. The laser beam oscillator 509 is controlled to generate the pulse signals shown in the waveform (2) of FIG. 13 corresponding to the output signals of the sensor 529. The direction of the laser beam 510 is switched as different mirrors 513-A, 513-B and 513-C in turn come in the path of the laser beam 510. The reflected laser beams 514, 515 and 516 are directed toward the three mirrors 517, 518 and 519, respectively. The laser beams reflected by these three mirrors again are reflected by three other mirrors 520, 521 and 522, and are applied to the three workpieces 523, 524 and 525, respectively. The waveforms of the laser beams 514, 515 and 516 are shown in FIG. 13(3), FIG. 13(4) and FIG. 13(5), respectively.

In the embodiment just described, the three workpieces 523, 524, 525 are processed under three different operating conditions using one laser beam oscillator which is controlled in its duty ratio.

The oscillated laser beam is not restricted to the waveform shown in FIG. 13(2), wherein only the duty ratio is changed. Instead, the kind of the operation can be changed by altering each pulse frequency shown in FIG. 13(3), FIG. 13(4) or FIG. 13(5), or by changing of the intensity of the laser beam. Additionally the operation can be changed by altering the frequency of the pulse train shown in FIG. 13(1), and that frequency is changed by altering of the number of rotation of the rotary disc. The number of mirrors provided on the rotary disc is selected freely. The adjusting means for each mirror is not limited to the method described above. Any methods for adjustment of the angle between the axis of the rotary disc and that of each mirror can be used, provided the angles that the mirrors are adjusted to differ from one another. By the above-mentioned angle adjustment, the laser beam can be directed as desired. In the present embodiment, the laser beam from the laser oscillator is reflected in different directions by the plural reflection mirrors disposed on the rotary disc at different angles with respect to one another. Therefore, plural workpieces can be processed using one laser oscillator, and a manufacturing system including the laser processing apparatus according to the present invention is improved remarkably in efficiency, because the laser oscillator can be utilized at very high efficiency.

Figure 14:
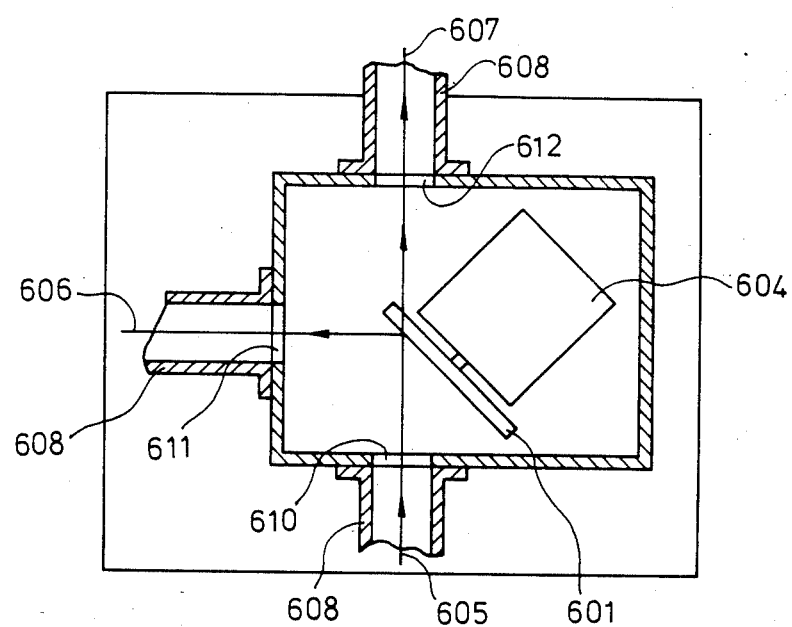
FIG. 14(a) is a first sectional view showing one example of light beam chopper which may be used as part of the present invention.
FIG. 14(b) is another sectional view of the beam-splitter of FIG. 14(a).
Figure 14:
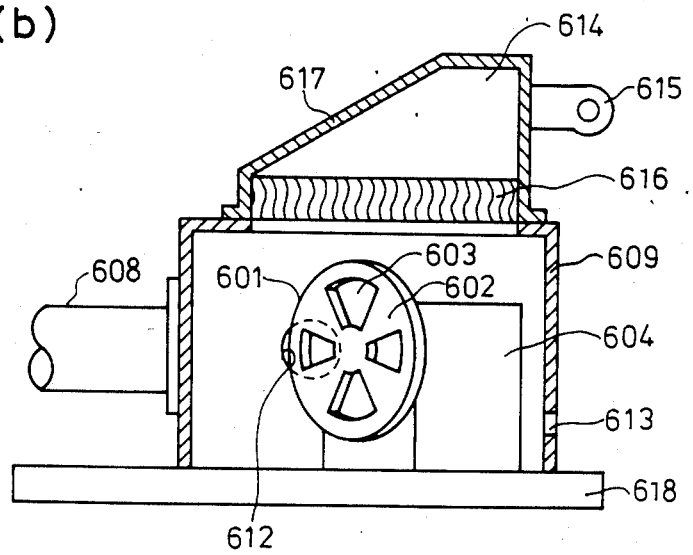

The embodiment now to be described relates for a housing to covering the rotary chopper mirror 601, its driving motor 604 and to an air blower means for blowing air to the rotary chopper mirror 601 through the air filter 616. Plan and cross-sectional views of this embodiment are shown in FIG. 14(a) and FIG. 14(b), respectively. The rotary chopper mirror 601 with mirror parts 602 and aperture parts 603 is fixed to the driving motor 604. The oscillated laser beam 605 is reflected in the direction 606 by the mirror parts 602 of the rotary chopper mirror 601. The unreflection portion 607 of the laser beam passes through the aperture parts 603 of the rotary chopper mirror 601. Three laser path protection tubes 608, 608, 608, are disposed at the first opening 610, at the second opening 611 and at the third opening 612. A hole 613 is disposed near the bottom of the housing 609. A filter unit 614 is fixed to the top of the housing 609. The filter unit 614 provides a blower 615, a filter 616 and a cover 617. A base plate 618 is provided for mounting the laser beam distributor thereon.

In this embodiment, the function and operation of the rotary chopper mirror 601 are similar to the above-described third embodiment, but the rotary chopper mirror 601 is protected from dust. The air which is blown by the blower 615 goes through the filter 616. The filtered air is directed to the rotary chopper mirror 601. Therefore, the rotary chopper mirror 601 is isolated from the dust typically found in a factory. Since its surface is always kept clean by the clean air flow, the rotary chopper mirror is not damaged by dust or small particles. In this embodiment, the clean air passed through the filter is applied directly to the rotary chopper mirror, and its environment is kept on extremely clean. Since air from the blower 615 is blown in the housing 609 with a certain air pressure, dust can not enter into the housing 609 from the small hole 613. Therefore, the rotary chopper mirror has a long life.

Figures 15A, 15B:
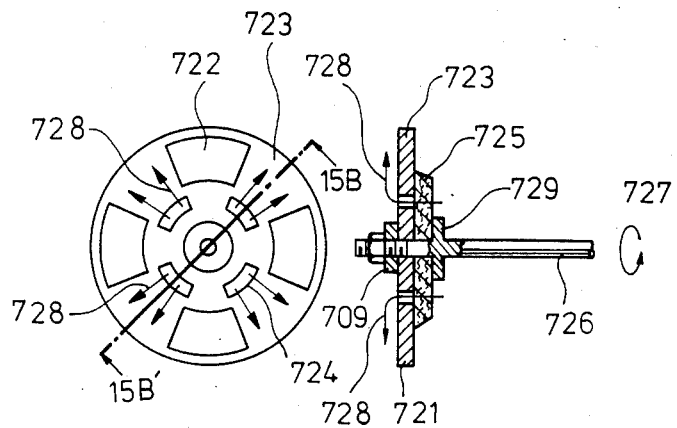
FIG. 15(a) is a front view of still another rotary chopper mirror which may be used in any of the foregoing embodiments.
FIG. 15(b) is a sectional view of the rotary chopper mirror of FIG. 15(a).

Another embodiment of a rotary chopper mirror is shown in FIGS. 15(a) and (b). A side view and cross-sectional view taken along line 15B-15B' are shown in FIG. 15(a) and in FIG. 15(b), respectively. The rotary chopper mirror 721 is provided with aperture parts 722, reflecting parts 723, and air holes 724 which are disposed between the reflecting parts 723 and a rotary shaft 725. A filter 726 is clamped by the rotary chopper mirror 721 and a flange 729, the filter covering the air holes 724 on the opposite surface of mirror 721 from the reflecting parts 723. When the rotary chopper mirror 721 rotates in the direction 727, air flow as shown by arrows 728 occur. Since the air holes 724 are covered by the air filter 725, air flowing past the surfaces of the reflecting parts 723 comes through the filter 725 whereby the air is cleaned. If small pieces of filter are fixed on the holes 724 instead of the disc filter illustrated, the effect of the filter is the same. Clean air always flows during the operation of the rotary chopper mirror, and the reflecting surfaces do not become dirty. Therefore, the rotary chopper mirror maintains a long life.

Figures 16A, 16B:
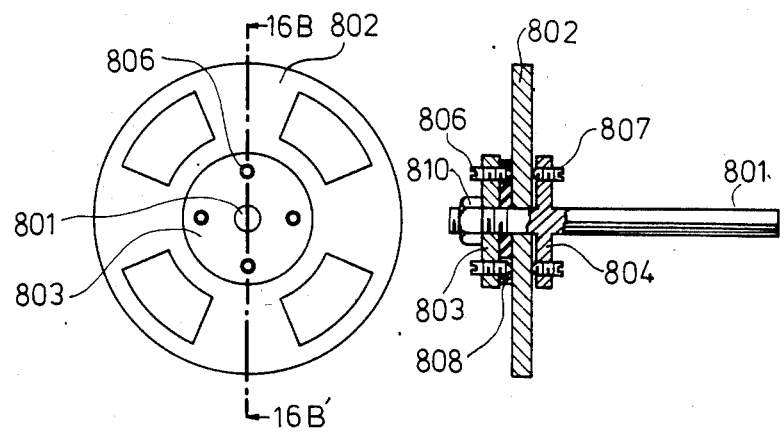
FIG. 16(a) is a front view of still another rotary chopper mirror which may be used in any of the foregoing embodiments.
FIG. 16(b) is a sectional view of the rotary chopper mirror of FIG. 16(a).

A still further embodiment of a rotary chopper mirror is shown in FIGS. 16(a) and (b). Plan and cross-sectional views of this embodiment are illustrated in FIG. 16(a) and FIG. 16(b), respectively. The rotary chopper mirror of this embodiment has a rotary shaft 801, plural reflecting parts 802, a first flange 803 with four adjusting screws 806, a second flange 804 with four adjusting screws 807 and an elastic member 808 clamped between the first flange 804 and the rotary chopper mirror. The second flange 804 is fixed on the rotary shaft 801. The rotary chopper mirror, the elastic member 808 and the first flange 803 are inserted onto the rotary shaft 801, and are secured by a nut 810 to the second flange. The elastic member 808 can be made of urethane ribber, for example. The angle between the shaft 801 and the surface of the rotary chopper mirror can be adjusted as follows. First, the screw 806 and 807 are loosened, and the rotary chopper mirror, the elastic member 808 and the first flange 803 are screwed loosely by the nut 810. The four screws 807 then are turned to displace the surface of the rotary chopper mirror 802. In this step, the angle between the surface of the rotary chopper mirror 802 and the shaft 801 is adjusted within 5 seconds of the desired angle. The angle is measured by an autocollimotor.

During the initial adjustment step, the rotary chopper mirror 802 is supported by the elastic force of the elastic member 808. In the next step, the screw 806 are turned to displace the surface of the rotary chopper mirror 802, so that the adjusted rotary chopper mirror 802 is held by the screws 806 and 807. In the adjustment process just described, the elasticity of the member 808 enables adjustment of the rotary chopper mirror from one side and the manipulation of the adjustment is very easy. The elastic member 808 also can be disposed between the rotary chopper mirror 802 and the second flange 804, or elastic members can be disposed on both sides of the rotary chopper mirror 802. The configuration of this embodiment of the rotary chopper mirror 802 enables easy and precise adjustments of the mirror mounting.

What is claimed is:

1. A laser apparatus for simultaneously processing multiple workpieces utilizing a single laser beam, comprising:

a laser oscillator to produce said laser beam;

at least one rotary chopper mirror disposed in a path of said beam, said mirror having reflective parts and beam-passage parts which sequentially are moved into said path as the mirror rotates in response to actuation of mirror rotating means, said beam being reflected towards a first workpiece when the beam strikes the reflective parts and being directed towards a second workpiece when said beam-passage parts are disposed in the path of the beam;

rotation control means for controlling rotation of said rotary chopper mirror; and means responsive to the rotation of the rotary chopper mirror for synchronizing oscillations and interruptions in oscillations of the laser oscillator to individually control the duty ratio of the beam applied to each workpiece.

2. A laser processing apparatus in accordance with claim 22, wherein said rotary chopper mirror comprises a substrate which is transparent to said light beam and a coating of a high reflectivity to said light beam at selected parts thereof.

3. A laser processing apparatus in accordance with claim 1 further comrprising a housing for covering said rotary chopper mirror, driving means for said rotary chopper mirror and member provided as a part of the housing.

4. A laser processing apparatus in accordance with claim 1, wherein said rotary chopper mirror has air blowing apertures disposed about the axis thereof, and air filter means provided on a face of said rotary chopper mirror which is opposite to a face having a coating of a high reflectivity to said light beam.

5. A laser processing apparatus in accordance with claim 1, which further comprises a pair of flanges fixed on a rotary shaft at a predetermined gap for holding said rotary chopper mirror therebetween, resilient means inserted between one of said flanges and said rotary chopper mirror and means for tying said flanges to narrow said gap thereby to tightly fix said rotary chopper mirror between said flanges.

* * * * *